(12) United States Patent
Stragapede

(10) Patent No.: US 6,885,929 B2
(45) Date of Patent: Apr. 26, 2005

(54) CONTROL METHOD FOR AN AUTOMATIC TRANSMISSION OF AN ENGINE-DRIVEN VEHICLE

(76) Inventor: Nicola Stragapede, Via Zanellato, 27, 10078 Venaria Reale (IT)

( * ) Notice: Subject to any disclaimer, the term of this patent is extended or adjusted under 35 U.S.C. 154(b) by 144 days.

(21) Appl. No.: 10/065,444

(22) Filed: Oct. 18, 2002

(65) Prior Publication Data

US 2004/0073348 A1 Apr. 15, 2004

(30) Foreign Application Priority Data

Oct. 19, 2001 (IT) .................................... TO2001A1002

(51) Int. Cl.[7] .............................................. G06F 17/00
(52) U.S. Cl. .............................. 701/52; 701/51; 701/61; 477/34; 477/68
(58) Field of Search ............................. 701/51, 52, 53, 701/60, 61, 70; 477/34, 46, 49, 68

(56) References Cited

U.S. PATENT DOCUMENTS

| | | | | |
|---|---|---|---|---|
| 4,740,898 A | * | 4/1988 | McKee et al. ................. | 701/70 |
| 6,157,884 A | * | 12/2000 | Narita et al. .................. | 701/51 |
| 6,363,805 B1 | | 4/2002 | Marchart ..................... | 74/335 |

FOREIGN PATENT DOCUMENTS

| | | |
|---|---|---|
| DE | 3544981 | 6/1987 |
| DE | 4311886 | 10/1994 |
| EP | 1039178 | 9/2000 |
| JP | 58124853 | 7/1983 |
| WO | 96/32299 | 10/1996 |

* cited by examiner

Primary Examiner—Gertrude A. Jeanglaude
(74) Attorney, Agent, or Firm—Howrey Simon Arnold & White LLP; Stephen H. Cagle

(57) ABSTRACT

A control method for an automatic transmission in which a first and a second control system are provided and regulate the transmission ratio respectively in automatic and in manual mode. The method comprises the stages of activating the first control system and automatically setting a transmission ratio, detecting the presence of a manual command from an operator to modify the transmission ratio in use, performing the manual command from the operator by modifying the transmission ratio set automatically, silencing the first control system for a predetermined time interval such that the transmission ratio set following the manual command is not modified following any automatic gear change request from the first control system, and attributing the control of the automatic transmission to the first control system.

5 Claims, 2 Drawing Sheets

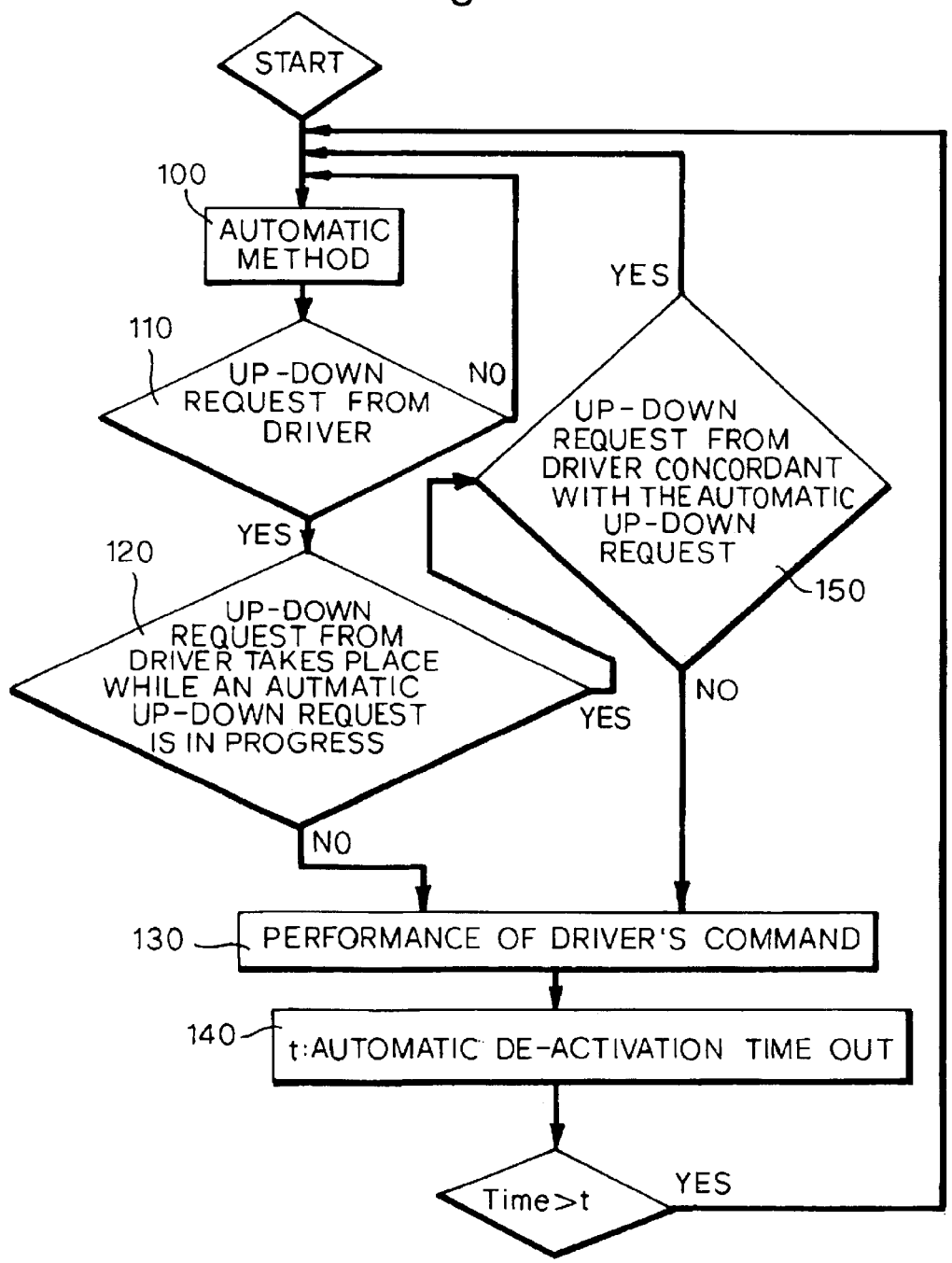

CONTROL METHOD FOR AN AUTOMATIC TRANSMISSION OF AN ENGINE-DRIVEN VEHICLE

CROSS REFERENCE TO RELATED APPLICATIONS

Priority under 35 U.S.C. § 119 is claimed of Italian Patent Application No. TO2001A 001002 filed on Oct. 19, 2001.

BACKGROUND OF THE INVENTION

1. Field of the Invention

The present invention relates to a control method for an automatic transmission of an engine-driven vehicle.

2. Background

Automatic transmissions for vehicles are known in which an electronic control unit generates signals for the control of a plurality of actuators (for instance of hydraulic type) which are coupled to a gear change and to a clutch and are used to cause the selection and engagement/disengagement of the gears and to cause the opening/closure of the clutch.

According to an automatic operating method, the control unit receives as input a plurality of data signals (vehicle speed, accelerator pedal position, revolutions per minute, torque supplied by the engine, etc.) which are processed to detect the most appropriate situations in which to perform a gear change, in particular an increment (UP-SHIFT) of the gear engaged or a decrement (DOWN-SHIFT) of the gear engaged.

These control units may also operate according to a manual operating method in which an operator acts on a control member (for instance of the lever type) in order to command the selection and engagement of the gears, in particular to perform a unit increment of the transmission ratio engaged or a unit decrement of the transmission ratio engaged.

Automatic transmissions are also known which provide for both of the above-mentioned operating methods (manual/automatic); these operating methods are mutually exclusive and the desired operating method is selected by a command from the operator.

Some automatic transmissions are, for instance, provided with a control lever which can be disposed in a first stable position for the actuation of the automatic operating method and in a second stable position which controls the engagement of the manual operating method; the operator may also displace the lever disposed in the second position in opposite directions in order to carry out unit increments/decrements of the gear engaged.

In other automatic transmissions operating by lever control, the lever may be disposed in a single position for the engagement of the manual operating method; here again, the operator can displace the lever disposed in the stable position in opposite directions in order to perform unit increments/decrements of the gear engaged. The automatic operating method is selected by actuating a dedicated switch, in particular a push-button switch.

In particular circumstances, the strategies for the choice of the transmission ratio engaged in the automatic method may not coincide with the choice that the driver would make. In such circumstances, it is advantageous for the operator to be able to modify the gear that has been selected and engaged in a fully automatic manner.

In known systems, in the above-mentioned circumstances, the driver may modify the gear in use only by exiting from the automatic operating method. This operation may be inconvenient for the operator.

SUMMARY OF THE INVENTION

The object of the present invention is to provide an automatic transmission adapted optimally to manage the two operating methods described above.

More particularly, the object of the present invention is to provide a system that allows the generation of commands of manual type without the need to de-activate the operating method of automatic type.

This object is achieved by the present invention which relates to a control method for an automatic transmission in which a first control system of automatic type receives as input data signals and processes them in order to generate drive signals for the transmission and automatically to set an optimum transmission ratio, this automatic transmission further comprising a second control system of manual type which receives as input control signals generated by an operator in order to generate drive signals for the transmission and manually to set a transmission ratio, characterised in that it comprises the stages of activating the first control system and automatically setting a transmission ratio, detecting the presence of a manual command given by an operator to modify the transmission ratio in use, performing the manual command given by the operator by modifying the transmission ratio set automatically, silencing the first control system for a predetermined time interval Tsleep such that the transmission ratio set following the manual command is not modified following an automatic gear change request from the first control system and attributing the control of the automatic transmission to the first control system.

BRIEF DESCRIPTION OF DRAWINGS

The invention is described below with particular reference to the accompanying drawings which show a preferred embodiment thereof and in which:

FIG. 2 is a block diagram showing the steps of the method of the present invention.

DETAILED DESCRIPTION

Figure 1:
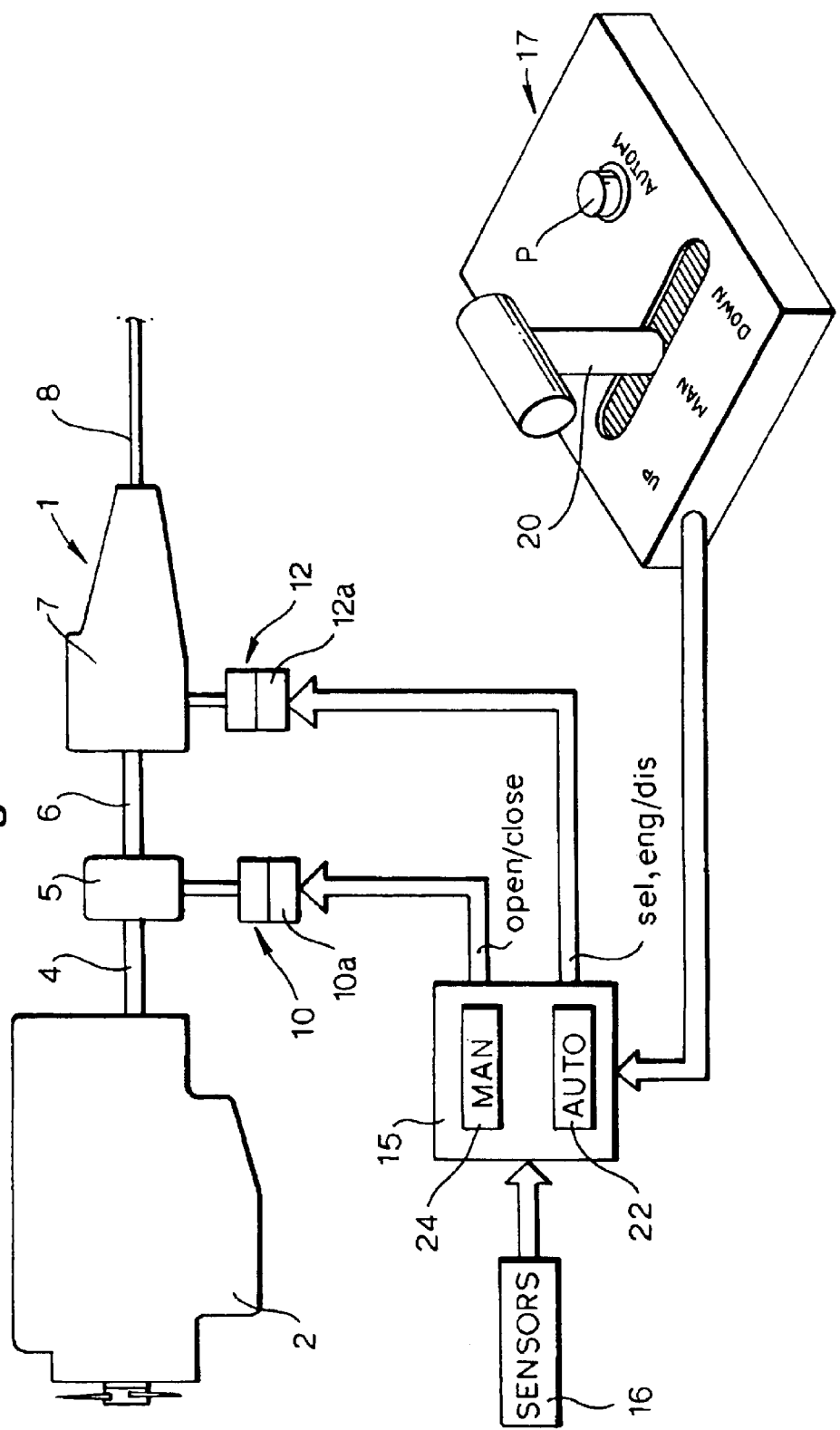
FIG. 1 is a diagram of an automatic transmission of an engine-driven vehicle operating according to the method of the present invention.

In FIG. 1, an automatic transmission (also called a robot transmission) of an engine-driven vehicle (which may be of any type, but is not shown for ease of description) is shown overall by 1.

The engine 2, in particular an internal combustion engine, has an output shaft 4 connected, by means of the interposition of a clutch 5, with the input shaft 6 of a gear change 7 having an output shaft 8 communicating via a transmission (not shown) with the vehicle wheels (not shown).

The clutch 5 is coupled to a first actuator unit 10 (of known type), in particular an actuator unit actuated hydraulically by means of pressurised oil, in order to open and close the clutch 5. The first actuator unit 10 comprises a power unit 10a which receives drive signals OPEN/CLOSE for the opening or closure of the clutch.

The gear change 7 is coupled to a second actuator unit 12 (of known type), in particular an actuator unit actuated hydraulically by means of pressurised oil, in order to carry out the operations to select the gears and to engage/disengage the gears selected.

The second actuator unit 12 comprises a power unit 12a which receives drive signals SEL for the selection of the rank of gears and command signals ENG/DIS for the engagement/disengagement of the gear selected.

The automatic transmission 1 comprises an electronic control unit 15 which receives a plurality of data and control signals as input and generates as output the above-mentioned drive signals OPEN/CLOSE for the opening or closure of the clutch 5 and SEL, ENG/DIS for the selection and engagement/disengagement of the gears of the gear change 7.

The electronic control unit in particular receives as input a plurality of data signals measured by sensors 16 and connected with the operation of the engine 2 (engine rotation speed, quantity of fuel injected into the engine, torque supplied, etc.) and with the operation of the gear change 7 and the course of the vehicle (vehicle speed, accelerator position, etc.).

The electronic unit 15 further receives control signals generated by a selector device 17 which can be manually operated by an operator (not shown).

In the non-limiting embodiment shown, the selector device 17 comprises a lever member 20 which can be disposed in a stable position in order to actuate a manual operating method of the transmission 1. The lever member 20 may further be manually displaced from the stable position to two opposite unstable positions (shown by UP and DOWN in FIG. 1) in order to command a unit increment (UP-SHIFT) of the gear engaged and a unit decrement (DOWN-SHIFT) of the gear engaged.

A push-button P is also provided and can be actuated to select the automatic operating method.

It will be appreciated that the selector device 17 may have a structure differing from that illustrated, and may for instance comprise a lever member 20 which can be disposed in a first unstable position (not shown) in order to actuate an automatic operating method of the transmission 1 and in a second stable position (not shown).

In this case, the lever member 20 may also be manually displaced from the second stable position to two opposite unstable positions in order to command a unit increment (UP-SHIFT) of the gear engaged and a unit decrement (DOWN-SHIFT) of the gear engaged.

The selector device 17 may also have a structure formed by steering-wheel commands (levers or push-buttons) in order to command a unit increment (UP-SHIFT) of the gear engaged and a unit decrement (DOWN-SHIFT) of the gear engaged. In this case, the selector device is provided with a push-button which can be actuated to select the automatic operating method.

The electronic unit 15 comprises a first control system 22 of automatic type which receives as input the data signals and the control signals and processes them in a known manner in order to generate drive signals OPEN/CLOSE, SEL, ENG/DIS and to set an optimum transmission ratio. As is known, during the operating method of automatic type, the control system 22 detects the most appropriate external conditions (vehicle speed, rpm, accelerator pedal position, engine torque, etc.) for commanding a unit increment or decrement of the gear engaged. The control of the gear change is thus fully delegated to the control system 22 of the transmission. The use of commands dedicated to gear change requests is limited solely to requests for reverse gear and neutral.

The electronic unit 15 further comprises a second control system 24 of manual type which receives as input the data signals and processes them in a known manner in order to generate drive signals OPEN/CLOSE, SEL, ENG/DIS and to set a transmission ratio imposed by the operator by actuating the selector device 17. The gear change thus takes place following an intentional request from the operator by his or her actuation of the lever member 20.

FIG. 2 shows the steps of the method of the present invention for the control of the automatic transmission 1.

A block 100, which controls the actuation of the automatic operating method, is initially reached; in this mode, the first control system 22 generates the drive signals for the clutch 5 and the gear change 7.

The block 100 is followed by a block 110 which checks for the presence of a command from the user to modify the transmission ratio currently set in accordance with the automatic operating method in use.

In the embodiment, shown, the block 110 checks for the presence of a gear change command given by acting on the lever member 20, i.e. it checks for the presence of a command adapted to perform a unit increase of the gear in use or a unit decrement of the gear in use.

If the user has not given a command, the block 110 is followed by the block 100, otherwise, if the user has given a command that has been detected by the block 110, the latter is followed by a block 120.

The block 120 checks whether the (manual) request for a gear change by the operator has been preceded by a predetermined (extremely small) time and/or is simultaneous with a gear change request generated automatically by the first control system 22.

If not, i.e. when the manual gear change request has not been preceded by or is not simultaneous with any gear change request generated automatically by the first control system 22, the block 120 is followed by a block 130 which performs the manually set command and therefore generates drive signals adapted to modify the transmission ratio by carrying out a unit gear increment (UP-SHIFT) or a unit gear decrement (DOWN-SHIFT) as requested by the operator.

The block 130 is followed by a block 140 which has a silencing function and de-activates the first control system 22 for a predetermined time interval Tsleep; during this period of de-activation Tsleep the first (automatic) control system 22 does not therefore generate drive signals and/or drive signals that may be generated automatically are not transferred to or actuated by the first and second actuator units 10 and 12.

In this way, the manual command set by the operator is performed and any gear change requests generated subsequently in an automatic manner in the de-activation time interval Tsleep are not performed. This prevents a gear change suggested by the driver from being followed very rapidly by another gear change desired by the automatic control system 22.

At the end of the de-activation interval Tsleep, the block 140 is followed by the block 100 by means of which the automatic transmission 1 is again controlled in a fully automatic manner.

When the block 120 detects that the (manual) gear change request from the operator has been preceded by a predetermined (extremely small) time and/or is simultaneous with a gear change request generated automatically by the first control system 22, the block 120 is followed by a block 150.

The block 150 detects whether the manual gear change request from the operator is concordant with the gear change request generated automatically by the first control system; the request is considered to be concordant when the operator requests a unit increase of the gear by acting manually on the lever member 20 and the first control system 22 also requests a unit increase of the gear, or when the operator requests a unit decrement of the gear by acting manually on the lever member 20 and the first control system also requests a unit decrement of the gear.

When the block 150 has detected concordant requests, there is a transition to the block 100 where the first control system 22 automatically performs the gear change that has also been requested manually by the operator. The performance of a gear change request generated by the operator is thus prevented if it takes place when a similar automatic gear change is already under way. The operator is not aware of the intervention of the automatic control system 22 since the gear change that he or she had requested is in any case performed.

When the block 150 has detected discordant requests, there is a transition to the block 130 which performs the command set manually, i.e. it generates drive signals adapted to bring about a unit gear increment (UP-SHIFT) or a unit gear decrement (DOWN-SHIFT) as a function of the manual actuation of the lever member 20 by the operator.

In operation, the method of the present invention manages the first automatic control system 22 and the second manual control system 24 by establishing the priorities between the gear commands set by the operator and those desired by the automatic control system 22; the following cases are in particular managed:

gear change request from the operator followed by a gear change request from the automatic system 22 the gear change request from the operator is performed and for an immediately successive interval no account is taken of the gear changes requested by the automatic control system 22. The gear change request from the driver is maintained for at least a time-out (de-activation interval Tsleep) defined by the control system of the transmission. At the end of the time-out, the system returns to automatic management. This prevents a gear change request from the automatic management from following too closely on the request from the operator;

gear change requested automatically followed by a gear change request from the driver: in this case there are two separate situations:

concordant gear changes: the gear change requested by the operator is ignored as it would duplicate the gear change that the control system 22 is already requesting automatically. It is assumed in this case that the operator has not had time to become aware that the system is in the process of performing a gear change;

discordant gear changes: account is taken of the operator's request.

This consequently provides a new method of operation in which, with the automatic method engaged, a gear change request from the driver is implemented and is interpreted as an instantaneous gear change suggestion without de-activating the automatic method and without the need for transition to the manual method.

All the functions of the manual and automatic operating methods of known type are, moreover, retained unchanged.

The method of the present invention has the advantage that it provides an automatic transmission which, in automatic operation, allows the selection of the gears to be engaged by allowing the operator to override the automatic control and thus to perform a gear change that satisfies his or her instantaneous driving needs.

It will be appreciated that the predetermined time interval Tsleep may be re-initialised on each gear change request from the operator (useful when such requests are given in succession). In this way, whenever a gear change request from the operator is followed, within the de-activation interval Tsleep, by a further gear change request again from the operator, the subsequent request causes the de-activation interval Tsleep to start again from zero.

It will lastly be appreciated that modifications and variations may be made to the above description without thereby departing from the scope of protection of the present invention.

What is claimed is:

1. A control method for an automatic transmission (1) in which a first control system of automatic type (22) receives as input data signals and processes them in order to generate drive signals (OPEN/CLOSE, SEL, ENG/DIS) for the transmission and automatically to set an optimum transmission ratio, this automatic transmission (1) further comprising a second control system (24) of manual type which receives as input control signals generated (17) by an operator in order to generate drive signals (OPEN/CLOSE, SEL, ENG/DIS) for the transmission and manually to set a transmission ratio, characterised in that it comprises the stages of:

activating (100) the first control system (22) and automatically setting a transmission ratio, detecting the presence (110) of a manual command from an operator to modify the transmission ratio in use, performing (130) the manual command from the operator by modifying the transmission ratio set automatically, silencing (130) the first control system (22) for a predetermined time interval (Tsleep) such that the transmission ratio set following the manual command is not modified as a result of an automatic gear change request from the first control system (22), attributing (100) the control of the automatic transmission to the first control system (22).

2. A method as claimed in claim 1, in which the detection of the presence of a manual command (110) is followed by the stage of checking (120) whether the manual gear change request has been preceded by a predetermined time and/or is simultaneous with a gear change request generated automatically by the first control system; when this checking stage has a negative outcome, it is followed by the stage of performing (130) the manual command set by the operator by modifying the transmission ratio set automatically as a function of the operator's requests.

3. A method as claimed in claim 2, in which, if the manual gear change request has been preceded by a predetermined time and/or is simultaneous with a gear change request generated automatically by the first control system, it is followed by a stage of checking whether the manual gear change request from the operator is concordant with the gear change request coming automatically from the first control system;

if the requests are found to be discordant, the manual command set by the operator is performed (130) by modifying the transmission ratio set automatically as a function of the operator's requests;

if the requests are found to be concordant, the first control system (22) is made available and automatically performs the gear change that has also been manually requested by the operator.

4. A method as claimed in claim 1, in which the stage of detecting the presence (110) of a manual command set by an operator comprises the stage of detecting the manual actuation of a control member (20) used to command a unit increment or a unit decrement of the transmission ratio in use.

5. A method as claimed in claim 1, in which the predetermined time interval (Tsleep) is re-initialised on each gear change request performed by the operator.

* * * * *

UNITED STATES PATENT AND TRADEMARK OFFICE
CERTIFICATE OF CORRECTION

PATENT NO. : 6,885,929 B2  
DATED : April 26, 2005  
INVENTOR(S) : Stragapede

It is certified that error appears in the above-identified patent and that said Letters Patent is hereby corrected as shown below:

<u>Title page,</u>
Insert Item:
-- [73] Assignee: Magneti Marelli Powertrain S.p.A. of Torino, Italy --.

Signed and Sealed this

Thirty-first Day of January, 2006

JON W. DUDAS
*Director of the United States Patent and Trademark Office*